O. OTTERSON.
METHOD OF MAKING REAMERS.
APPLICATION FILED MAY 23, 1919.
1,341,436.
Patented May 25, 1920.
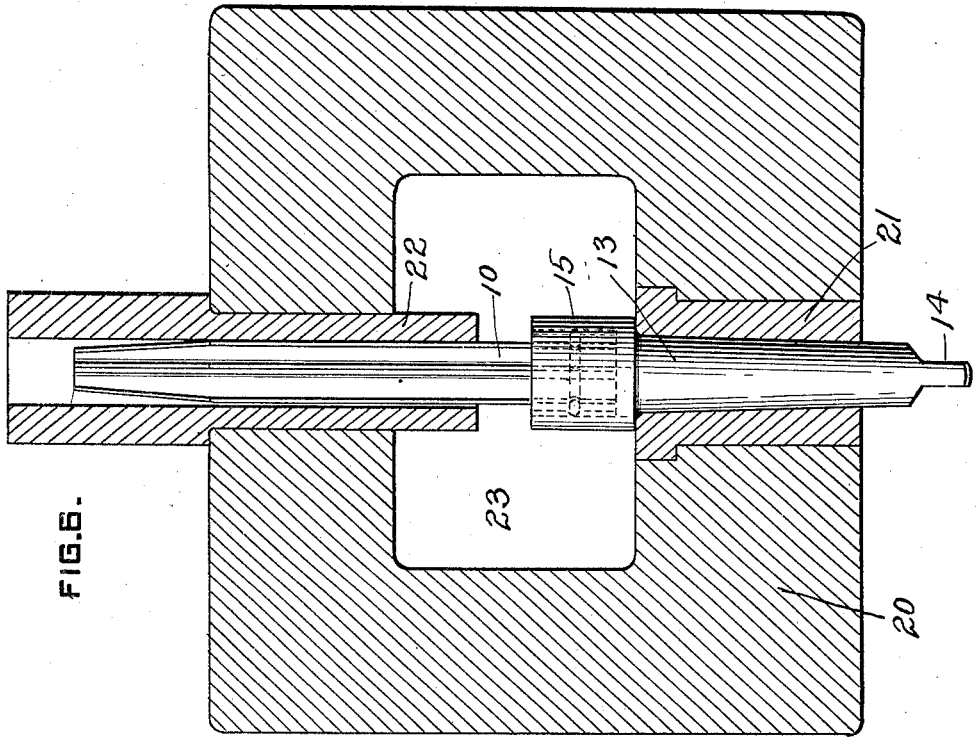
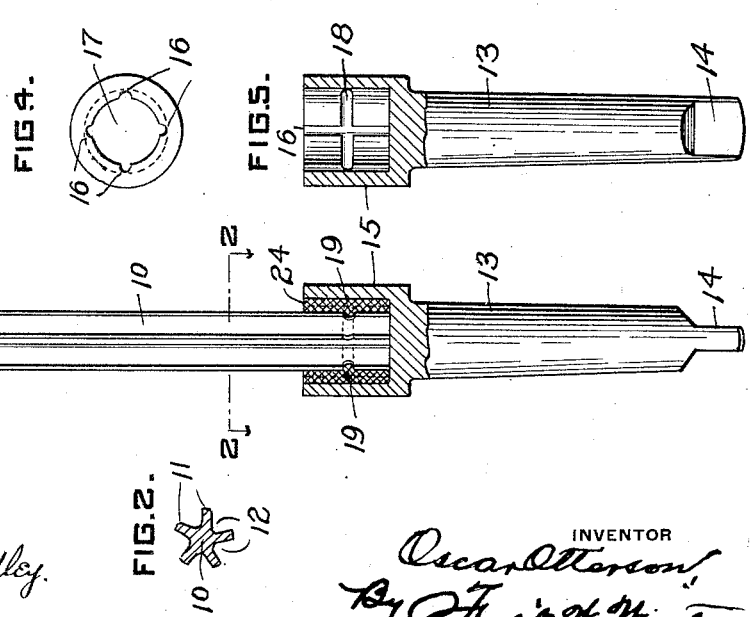
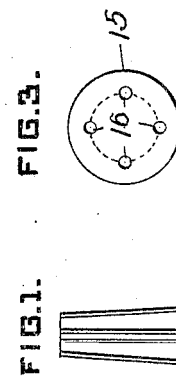
WITNESSES
J. Herbert Bradley.
INVENTOR
Oscar Otterson
By Fred'k H. Wisley
Attorney

UNITED STATES PATENT OFFICE.

OSCAR OTTERSON, OF BUTLER, PENNSYLVANIA.

METHOD OF MAKING REAMERS.

1,341,436.     Specification of Letters Patent.     Patented May 25, 1920.

Application filed May 23, 1919. Serial No. 299,163.

*To all whom it may concern:*

Be it known that I, OSCAR OTTERSON, a resident of Butler, in the county of Butler and State of Pennsylvania, have invented a new and useful Improvement in Methods of Making Reamers, of which the following is a specification.

This invention relates to reamers, drills, and other similar rotary tools, and more particularly to the method of making such tools having a bit or cutting portion of high speed steel and a holder or shank portion of ordinary steel.

The object of the invention is to provide a method whereby a composite tool of this character can be constructed by the use of only a small amount of high speed steel and in a manner which will form an accurate tool in which the parts are firmly secured together, and to produce such tools by means of simple operations which can be quickly and economically performed by the use of ordinary machine shop equipment.

In the accompanying drawings Figure 1 is a side elevation, partly in section, of the finished tool; Fig. 2 is a cross section thereof on the line 2—2, Fig. 1; Fig. 3 is an end view of the shank portion of the tool showing the same after the first operation; Fig. 4 is a similar view illustrating the same after the second operation; Fig. 5 is a longitudinal sectional view through the socket portion of the shank, and Fig. 6 is a sectional view showing the manner of connecting the bit and shank.

The accompanying drawings show the invention applied to the manufacture of a reamer having a bit portion 10, longitudinally fluted from end to end to provide the cutting ribs 11 with the grooves or flutes 12 between adjacent ribs. This bit will be formed of high speed steel, which is an expensive metal, and consequently said bit portion will be no longer than to provide the necessary length of cutting portion of the tool. It is grooved or fluted from end to end and therefore can be produced by simple mechanical operations.

13 indicates the shank of the tool, provided at one end with a driven tang 14 and at its opposite end with the enlargement 15 provided with a socket in which the bit is secured. This shank will be formed of ordinary steel and constitutes the major portion of the weight of the finished tool. This shank portion can be formed by any suitable mechanical operation, as now practised for similar tool parts.

The socket in the portion 15 of the shank is formed in the following manner:

First, a plurality of small holes 16 are drilled endwise into the head 15 in a circle at a distance from the axis of the shank portion depending upon the size of the bit portion to be inserted therein, as shown in Fig. 3. Next a single large hole 17 is drilled axially into said portion to the depth of the intended socket, said large hole being of such size as to intercept the series of small holes 16, whereby a socket is formed provided in its walls with a series of semi-cylindrical grooves as shown in Fig. 4. Next a transverse groove 18 may, and preferably is, formed in the inner wall of said socket, between the bottom and top thereof, as shown in Fig. 5. This groove can be formed by a suitably shaped tool on a lathe or similar machine. The portion of the bit 10 which goes into this socket preferably has the edges of its ribs 11 provided with notches 19 in position to lie opposite the transverse grooves 18 when the bit is inserted in the socket.

The parts are then assembled in the manner illustrated in Fig. 6, in which 20 indicates a suitable jig having a bushing 21 in which the shank portion is held, and opposite the same a bushing 22 in which the bit portion is held. These two bushings are in exact alinement with each other and are made of a size to be accurately fitted by the shank and bit portions respectively. Consequently said portions are held in accurate alinement with each other. The jig is open on both sides, as at 23, and after the parts are assembled, as described, molten metal, such as Babbitt metal, is poured into the open end of the socket until the socket around the end of the bit portion is entirely filled with molten metal. Preferably the socket portion of the shank will be preheated to a temperature substantially that of the molten metal used, which can be conveniently done by dipping it into the Babbitt metal pot. The parts are held in this position until the molten metal has solidified. Upon cooling, the head of the shank shrinks and tightens the Babbitt metal and bit so as to produce a solid joint.

The longitudinal flutes and transverse notches and the longitudinal and transverse grooves in the socket become filled with the Babbitt metal, shown at 24, Fig. 1, and these parts act as keys to effectively key the bit portion in the shank and prevent the bit portion from being pulled out of the socket or turning in the shank without actually destroying the Babbitt metal.

The tool described is economical to produce because of the simplicity of the operations necessary to form the two parts and unite them. The composite tool is much cheaper than a solid high speed steel tool, due to the small amount of high speed steel that is necessary. Furthermore the shank can be used over and over again. When the bit wears out, the Babbitt or other metal can be melted out and a new bit portion inserted in the shank in the way already described. The tool is very accurate since the manner of forming and assembling the bit and shank provides for an exact alinement thereof.

The invention described can obviously be used for making not only reamers but also drills and other rotary tools.

I claim:

1. The method of making a tool of the character described, consisting in forming a tool bit with longitudinal grooves, forming a shank member, drilling one or more small holes into the end of the shank member eccentric to the axis thereof, drilling a large hole axially into said shank member and intercepting the small holes, whereby a socket is formed provided with longitudinal grooves in its walls, inserting the end of the drill bit into said socket, and pouring molten metal into said socket around the bit and thereby securing the bit in said socket.

2. The method of making tools of the character described, consisting in forming a bit member with longitudinal grooves, forming a shank member, drilling one or more small holes endwise into the shank member eccentric to the axis thereof, drilling a large hole axially into said shank member and intercepting the small holes, whereby a socket is formed with longitudinal grooves in its side walls, and filling the space in the socket around the bit with softer metal and thereby securing the bit in said socket.

3. The method of making tools of the character described, consisting in forming a tool bit with longitudinal grooves, forming a shank member with a socket provided with longitudinal grooves, heating the socket portion of the shank member, inserting the end of the tool bit therein, pouring molten metal into said socket around the bit and allowing the same to cool.

4. The method of making tools of the character described, consisting in forming a longitudinally fluted tool bit, forming a shank member with a socket provided with longitudinal grooves, inserting the end of said bit into said socket, holding the parts in alinement, then pouring molten metal into said socket around the end of said bit, and holding the bit and shank portion in alinement until said molten metal cools.

5. The method of making tools of the character described, consisting in forming a fluted tool bit with transverse grooves, forming a shank member with a socket provided with longitudinal and transverse grooves, inserting the end of said bit into said socket, holding the parts in alinement, and pouring molten metal into said socket around the bit and thereby securing the bit in said socket.

In testimony whereof I have hereunto set my hand.

OSCAR OTTERSON.

Witness:
ALICE A. TRILL.